(12) United States Patent
Yamazaki

(10) Patent No.: US 10,673,656 B2
(45) Date of Patent: Jun. 2, 2020

(54) BASE STATION AND METHOD THEREIN

(71) Applicant: NEC CORPORATION, Tokyo (JP)

(72) Inventor: Kenichiro Yamazaki, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/263,584

(22) Filed: Jan. 31, 2019

(65) Prior Publication Data

US 2019/0280902 A1    Sep. 12, 2019

(30) Foreign Application Priority Data

Mar. 6, 2018   (JP) ................................ 2018-039371

(51) Int. Cl.
| | |
|---|---|
| *H04W 4/00* | (2018.01) |
| *H04L 25/02* | (2006.01) |
| *H04B 7/06* | (2006.01) |
| *H04B 7/10* | (2017.01) |
| *H04B 1/7117* | (2011.01) |
| *H04B 1/7113* | (2011.01) |

(52) U.S. Cl.
CPC ........ *H04L 25/0248* (2013.01); *H04B 1/7113* (2013.01); *H04B 1/7117* (2013.01); *H04B 7/0617* (2013.01); *H04B 7/10* (2013.01)

(58) Field of Classification Search
None
See application file for complete search history.

(56) References Cited

U.S. PATENT DOCUMENTS

| | | | |
|---|---|---|---|
| 2011/0268037 A1 | 11/2011 | Fujimoto | |
| 2016/0006122 A1* | 1/2016 | Seol | .......... H01Q 3/24 |
| | | | 342/372 |
| 2016/0094284 A1* | 3/2016 | Yum | .................... H04B 7/0456 |
| | | | 375/267 |
| 2016/0182196 A1* | 6/2016 | Lorca Hernando | ... H04L 5/0094 |
| | | | 375/267 |
| 2018/0048363 A1 | 2/2018 | Okuyama et al. | |

FOREIGN PATENT DOCUMENTS

| | | |
|---|---|---|
| WO | 2010/079582 A1 | 7/2010 |
| WO | 2016/140276 A1 | 9/2016 |

* cited by examiner

*Primary Examiner* — Clemence S Han
(74) *Attorney, Agent, or Firm* — Sughrue Mion, PLLC

(57) ABSTRACT

In order to make it possible to prevent occurrence of an interference among terminal apparatuses when a base station forms a beam toward a terminal apparatus by beam-forming to transmit a downlink signal, and to improve reception quality at a terminal apparatus. A base station of the present disclosure includes a memory storing instructions and one or more processors configured to execute the instructions to: perform channel estimations respectively on a plurality of terminal apparatuses; and determine a transmission layer of a target terminal apparatus by comparing angular profiles respectively obtained on the basis of channel estimates on the target terminal apparatus and at least one comparable terminal apparatus out of the plurality of terminal apparatuses and performing a path exclusion process to exclude, from transmission layers of the target terminal apparatus, a path that falls within a certain angular range around a path angle indicated by an angular profile of the at least one comparable terminal apparatus.

11 Claims, 10 Drawing Sheets

BASE STATION AND METHOD THEREIN

BACKGROUND

Technical Field

The present disclosure relates to a base station that is involved in transmission and/or reception of data through a radio access network, and a method therein.

Background Art

It is under consideration in Third Generation Partnership Project (3GPP) that, in a system that conforms to the fifth generation (5G) standards, a base station performs beam-forming in a high frequency band to transmit data with high gain to a distant terminal apparatus.
[PTL 1] WO 2016/140276
[PTL 2] WO 2010/079582

SUMMARY

When a base station forms a beam toward a terminal apparatus by beam-forming to transmit a downlink signal under a condition that there is at least a further terminal apparatus other than the intended terminal apparatus, a problem is that an interference occurs at the further terminal apparatus depending on radio wave propagation characteristics between the base station and each terminal apparatus and reception quality at the further terminal apparatus deteriorates. However, existing beam-forming signal transmission technologies took no measures on such occurrence of an interference among terminal apparatuses.

Therefore, an example object of the present disclosure is to provide a technology that can prevent occurrence of the interference among terminal apparatuses when a base station forms a beam toward a terminal apparatus by beam-forming to transmit a downlink signal, and improve reception quality at a terminal apparatus.

A base station according to the present disclosure includes a memory storing instructions and one or more processors. The one or more processors are configured to execute the instructions to: perform channel estimations respectively on a plurality of terminal apparatuses; and determine a transmission layer of a target terminal apparatus by comparing angular profiles respectively obtained on the basis of channel estimates on the target terminal apparatus and at least one comparable terminal apparatus out of the plurality of terminal apparatuses and performing a path exclusion process to exclude, from transmission layers of the target terminal apparatus, a path that falls within a certain angular range around a path angle indicated by an angular profile of the at least one comparable terminal apparatus.

A method according to the present disclosure includes: performing channel estimations respectively on a plurality of terminal apparatuses; and determining a transmission layer of a target terminal apparatus by comparing angular profiles respectively obtained on the basis of channel estimates on the target terminal apparatus and at least one comparable terminal apparatus out of the plurality of terminal apparatuses and performing path exclusion process to exclude, from transmission layers of the target terminal apparatus, a path that falls within a certain angular range around a path angle indicated by an angular profile of the at least one comparable terminal apparatus.

According to the present disclosure, it will be possible to prevent occurrence of an interference among terminal apparatuses when a base station forms a beam toward a terminal apparatus by beam-forming to transmit a downlink signal, and to improve reception quality at a terminal apparatus. Note that the technology according to the present disclosure may exert other advantageous effects instead of the above advantageous effect or together with the above advantageous effect.

DESCRIPTION OF THE EXAMPLE EMBODIMENTS

Example embodiments of the present disclosure will be described in detail below with reference to the accompanying drawings. Note that, in the present specification and drawings, elements to which similar descriptions are applicable are denoted by the same reference signs, whereby overlapping descriptions may be omitted.

Descriptions will be given in the following order.
1. Overview of the Example Embodiments of the Present Disclosure
2. Configuration of System According to Example Embodiments of the Present Disclosure
3. First Example Embodiment
3.1. Configuration of Base Station
3.2. Configuration of Terminal Apparatus
3.3. Technical Features
4. Second Example Embodiment
4.1. Configuration of Base Station
4.2. Technical Features
5. Other Modes

Figure 1:
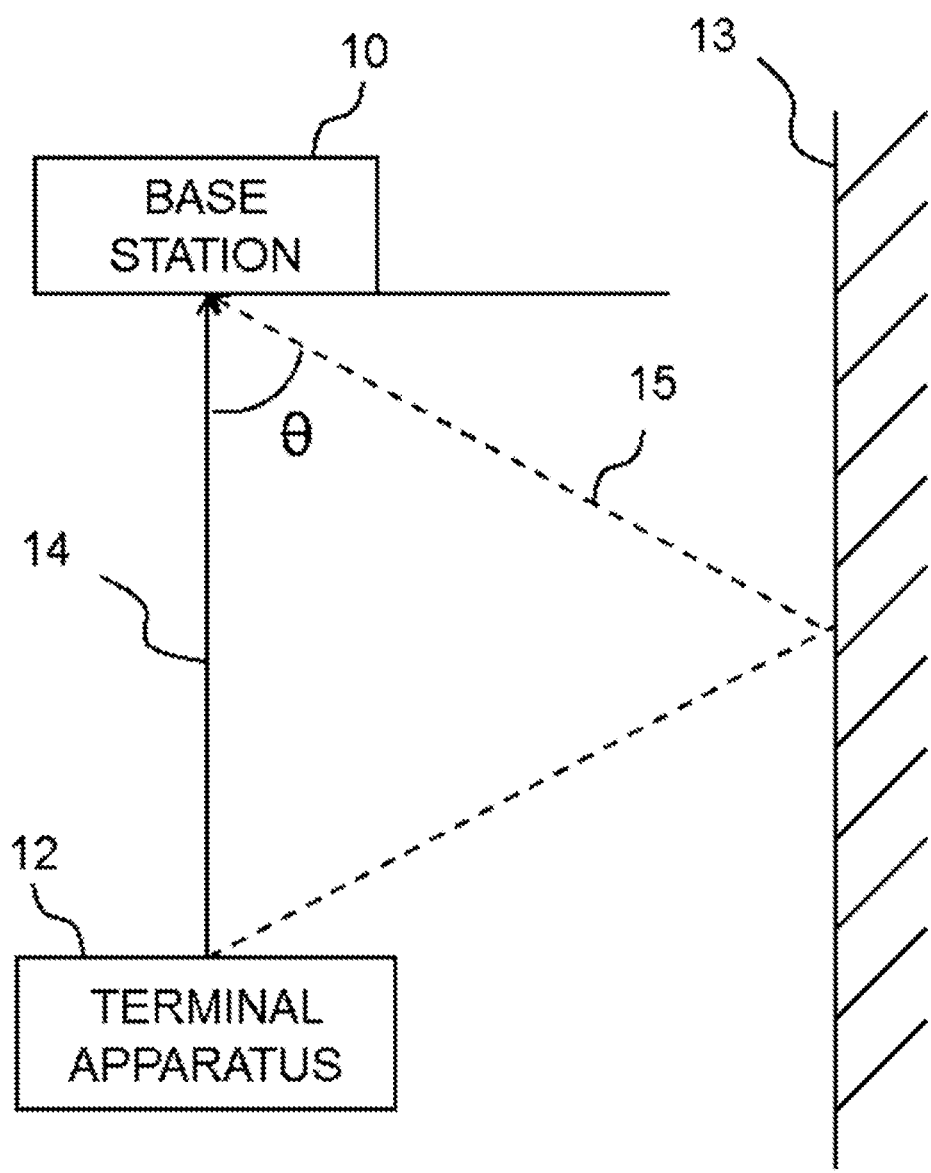
FIG. 1 is schematic diagram for describing a radio wave propagation environment between a base station and a terminal apparatus.

1. Overview of the Example Embodiments of the Present Disclosure (1) Technical Issues
Radio wave propagation characteristics between a base station and a terminal apparatus is described with reference to FIG. 1. The description assumes, as an example, an environment where there are a base station 10 and a terminal apparatus 12 as well as a wall 13 located beside them. If the terminal apparatus 12 transmits a signal toward the base station 10, a direct path 14 that directly travels from the terminal apparatus 12 to the base station 10 and a reflected path 15 that travels to the base station 10 after reflecting off the wall 13 arise.

Figure 2:
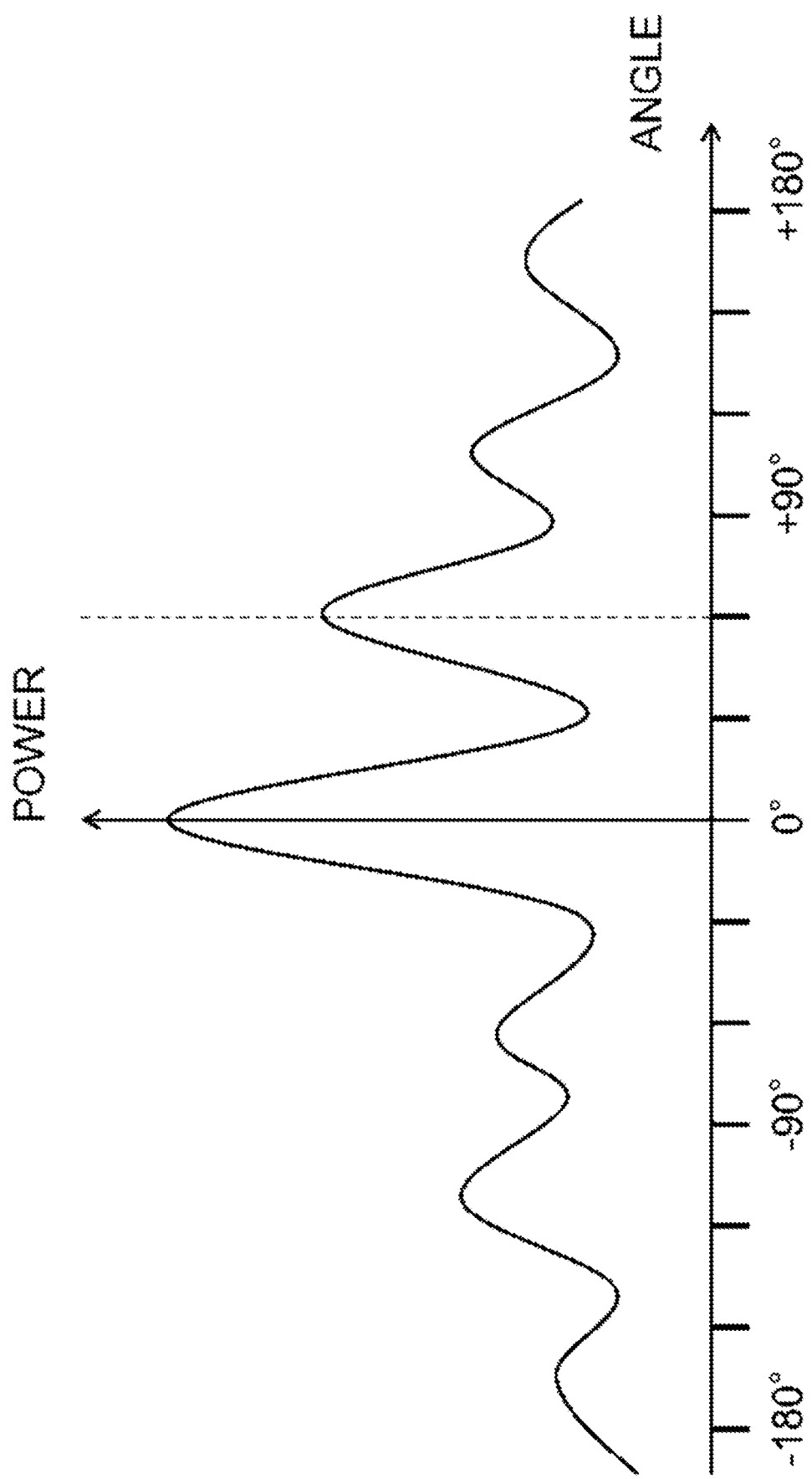
FIG. 2 is a diagram illustrating an example of an angular profile.

An example angular profile of this case is illustrated in FIG. 2. The first peak of the waveform appears at the direction of zero degree due to the direct path 14. Meanwhile, the second peak of the waveform appears at the direction of sixty degrees due to the reflected path 15 in a case where, for example, the azimuth angle θ with respect to the reference direction when entering the base station 10 is sixty degrees.

Herein, for example, assume a Time Division Duplex (TDD) system in which a base station 10 receives an uplink signal from the terminal apparatus 12, calculates beam-forming weights (BF Weights) and uses the beam-forming weights to perform beam-forming thereby transmitting a downlink signal to the terminal apparatus 12. In this case, if the number of transmission layers (which equals to the number of transmission streams) from the base station 10 to the terminal apparatus 12 is one and the eigenvalue of the direct path 14 is larger than that of the reflected path 15, the base station 10 transmits the downlink signal to the terminal apparatus 12 by beam-forming to form a beam that goes along the direction of the direct path 14.

Figure 3:
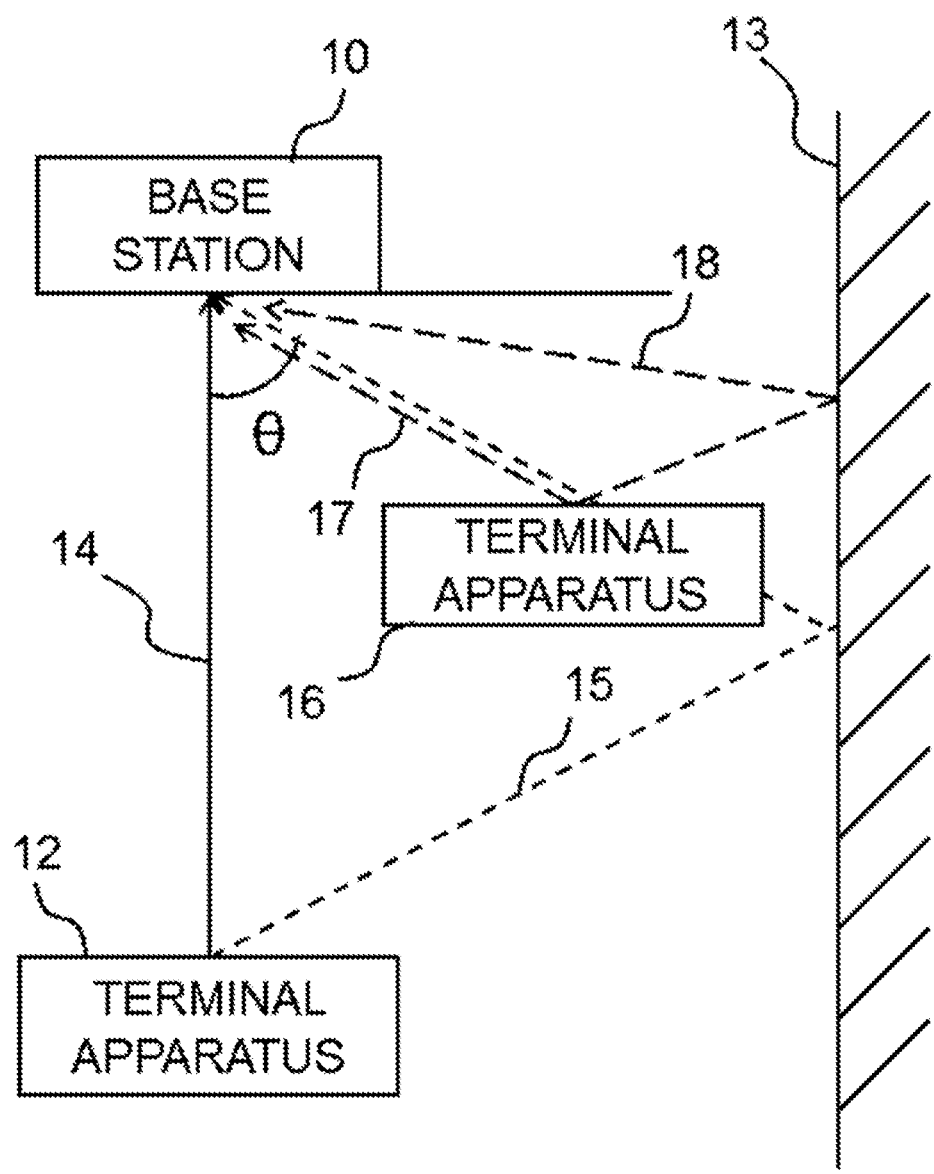
FIG. 3 is a schematic diagram for describing a radio wave propagation environment in a case where there are a base station and two terminal apparatuses.

Next, consider an environment where there are not only the base station 10 and the terminal apparatus 12 but also the terminal apparatus 16 as illustrated in FIG. 3.

Also in the case of the terminal apparatus 16, similarly to the case of the terminal apparatus 12, there are the direct path 17 from the terminal apparatus 16 to the base station 10 and the reflected path 18 that reflects off the wall 13. If the eigenvalue level of the direct path 17 is larger than that of the reflected path 18, the base station 10 transmits a downlink signal to the terminal apparatus 16 by beam-forming to form a beam that goes along the direction of the direct path 17. Thus, the base station 10 will transmit downlink signals to the terminal apparatus 12 along the direct path 14 and to the terminal apparatus 16 along the direct path 17.

Herein, if the angles θ in horizontal direction when entering the base station 10 of the reflected path 15 from the terminal apparatus 12 to the base station 10 and the direct path 17 from the terminal apparatus 16 to the base station 10 are the same or within a certain angular range, an inter-terminal interference occurs between the terminal apparatus 12 and the terminal apparatus 16 because the signal that the base station 10 transmits to the terminal apparatus 16 by forming a beam along the direction of the direct path 17 reflects off the wall 13 and enters the terminal apparatus 12, which causes a problem that reception quality at the terminal apparatus 12 deteriorates.

An example object of the present disclosure is to prevent occurrence of such an interference among terminal apparatuses when a base station forms a beam toward a terminal apparatus by beam-forming to transmit a downlink signal, and to improve reception quality at a terminal apparatus.

(2) Technical Feature

According to example embodiments of the present disclosure, for example, a base station is configured to perform channel estimations respectively on a plurality of terminal apparatuses and to determine a transmission layer of a target terminal apparatus by comparing angular profiles respectively obtained on the basis of channel estimates on the target terminal apparatus and at least one comparable terminal apparatus out of the plurality of terminal apparatuses and performing path exclusion process to exclude, from transmission layers of the target terminal apparatus, a path that falls within a certain angular range around a path angle indicated by an angular profile of the at least one comparable terminal apparatus.

This, for example, makes it possible to prevent occurrence of an interference among terminal apparatuses when a base station forms a beam toward a terminal apparatus by beam-forming to transmit a downlink signal, and to improve reception quality at a terminal apparatus.

Note that the above-described technical features are mere concrete examples of example embodiments of the present disclosure and, of course, the example embodiments are not limited to the above-described technical features.

Figure 4:
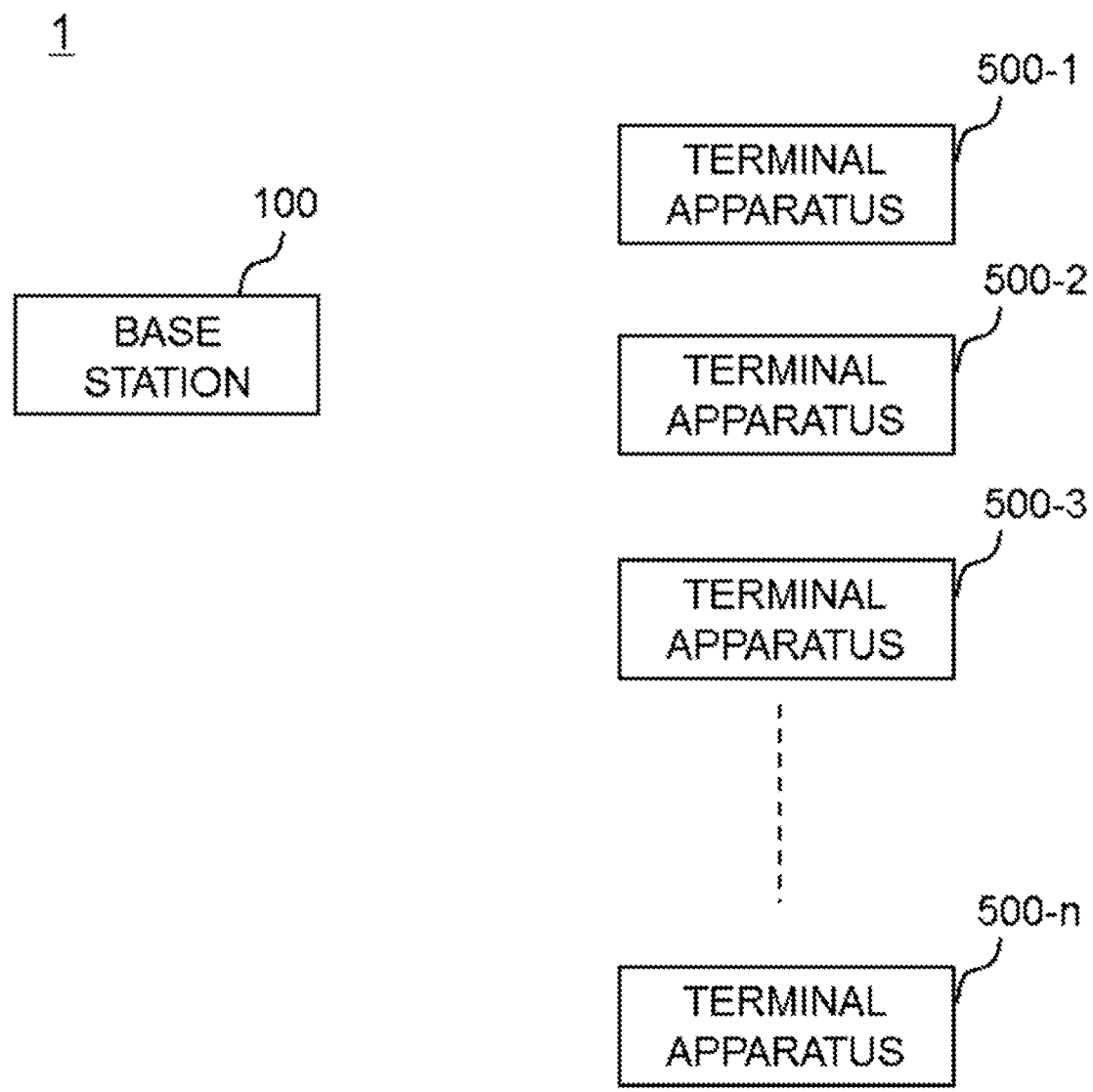
FIG. 4 is an explanatory diagram illustrating an example of a schematic configuration of a system according to example embodiments of the present disclosure.

2. Configuration of System According to Example Embodiments of the Present Disclosure An example of a configuration of a system 1 according to the example embodiments is described with reference to FIG. 4. FIG. 4 is an explanatory diagram illustrating an example of a schematic configuration of the system 1 according to the example embodiments. Referring to FIG. 4, the system 1 includes a base station 100 and terminal apparatuses 500-1, 500-2, 500-3, . . . , 500-n. Herein, n is an integer that is equal to or larger than two and the system 1 includes two or more terminal apparatuses 500. Note that the illustration of the plurality of terminal apparatuses 500 in FIG. 4 does not indicate locations or positional relationship in the real space.

For example, the system 1 is a system that conforms to a standard of 3GPP. More specifically, the system 1 is a system that conforms to the fifth generation (5G) standards. Alternatively, the system 1 may be a system that conforms to LTE, LTE-Advanced or LTE-Advanced Pro and/or System Architecture Evolution (SAE) or to Universal Mobile Telecommunications System (UMTS) which belongs to the third generation (3G) standards. Of course, the system 1 is not limited to these examples.

(1) Base Station 100

The base station 100 is a node that performs wireless communication with terminal apparatuses and, in other words, a Radio Access Network (RAN) node. For example, the base station 100 directs its beams toward a plurality of terminal apparatuses 500 to transmit signals respectively. The base station 100 may be an eNB, a generation Node B (gNB) and/or a Transmission Reception Point (TRP) in 5G or a Node B and/or a Radio Network Controller (RNC) in 3G. The base station 100 may include a plurality of units (or a plurality of nodes). The plurality of units (or plurality of nodes) may include a first unit (or first node) for performing processing of a higher protocol layer and a second unit (or second node) for performing processing of a lower protocol layer. As an example, the first unit may be referred to as Center/Central Unit (CU) and the second unit may be referred to as Distributed Unit (DU) or Access Unit (AU). As another example, the first unit may be referred to as Digital Unit (DU) and the second unit may be referred to as Radio Unit (RU) or Remote Unit (RU). The Digital Unit (DU) may be a Base Band Unit (BBU) and the RU may be a Remote Radio Head (RRH) or a Remote Radio Unit (RRU). Of course, the names of the first unit (or first node) and the second unit (or second node) are not limited to such examples. Alternatively, the base station 100 may be a single unit (or single node). In this case, the base station 100 may be one of the plurality of units (for example, one of the first and second units) and may be connected to another unit of the plurality of units (for example, the other one of the first and second units).

(2) Terminal Apparatus 500

The plurality of terminal apparatuses 500 respectively perform wireless communication with the base station 100. For example, the plurality of terminal apparatuses 500 respectively receives signals that the base station 100 transmits to the terminal apparatuses 500 with the beams. For example, the terminal apparatuses 500 are UEs.

3. First Example Embodiment

Next, the first example embodiment of the present disclosure is described with reference to FIG. 5 to FIG. 9.

<3.1. Configuration of Base Station>

Figure 5:
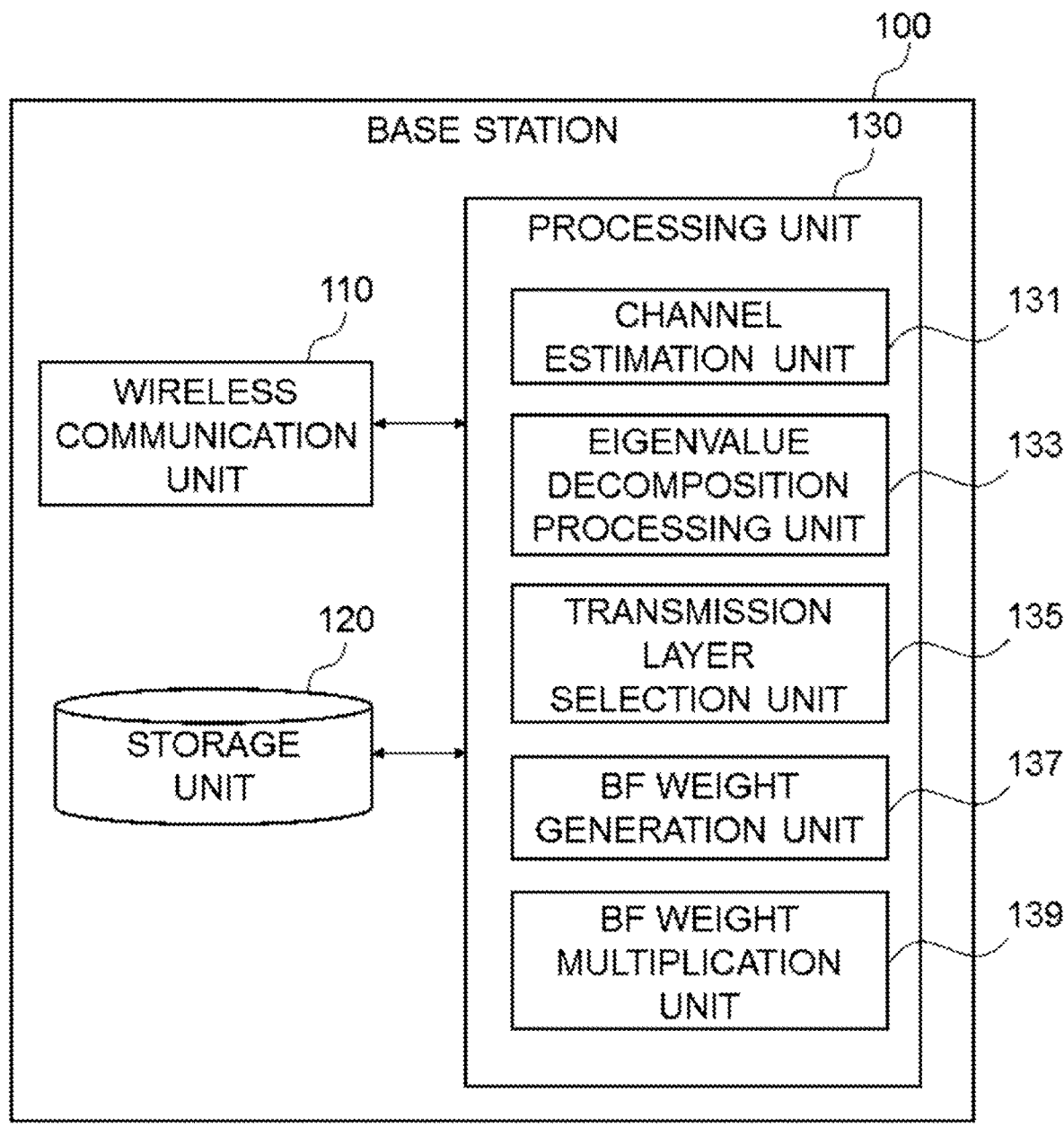
FIG. 5 is a block diagram illustrating an example of a configuration of a base station according to a first example embodiment.

First, an example of a configuration of the base station 100 according to the first example embodiment is described with reference to FIG. 5. FIG. 5 is a block diagram illustrating an example of a schematic configuration of the base station 100 according to the first example embodiment. Referring to FIG. 5, the base station 100 includes a wireless communication unit 110, a storage unit 120 and a processing unit 130.

(1) Wireless Communication Unit 110

The wireless communication unit 110 is configured to wirelessly transmit and receive signals. For example, the wireless communication unit 110 receives a signal from a terminal apparatus and transmits a signal to a terminal apparatus.

(2) Storage Unit 120

The storage unit 120 is configured to store programs and parameters for operation of the base station 100 as well as various data temporarily or permanently.

(3) Processing Unit 130

The processing unit 130 is configured to provide various functions of the base station 100. The processing unit 130 includes a channel estimation unit 131, an eigenvalue decomposition processing unit 133, a transmission layer selection unit 135, a BF weight generation unit 137 and a BF weight multiplication unit 139. Note that the processing unit 130 may further include another constituent element than these constituent elements. That is, the processing unit 130 may perform operations other than the operations of these constituent elements. Specific actions of the channel estimation unit 131, the eigenvalue decomposition processing unit 133, the transmission layer selection unit 135, the BF weight generation unit 137 and the BF weight multiplication unit 139 will be described in detail later.

For example, the processing unit 130 generates a signal to be transmitted on a beam to a specific terminal apparatus 500 (for example, the terminal apparatus 500-1) through the wireless communication unit 110.

(4) Implementation Examples

The wireless communication unit 110 may be implemented with a directional antenna, a high frequency (Radio Frequency (RF)) circuit and the like. The storage unit 120 may be implemented with a memory (for example, non-volatile memory and/or volatile memory), hard disc and/or the like. The processing unit 130 may be implemented with a Base Band (BB) processor, another processor and/or the like. The channel estimation unit 131, the eigenvalue decomposition processing unit 133, the transmission layer selection unit 135, the BF weight generation unit 137 and the BF weight multiplication unit 139 may be implemented with the same processor or with respective different processors. The above memory (the storage unit 120) may be included in such a processor (a chip).

The base station 100 may include a memory that stores programs and one or more processors that are capable of executing the programs and the one or more processors may execute the operations of the processing unit 130 (operations of the channel estimation unit 131, the eigenvalue decomposition processing unit 133, the transmission layer selection unit 135, the BF weight generation unit 137 and the BF weight multiplication unit 139). The programs may be programs for causing a processor to execute the operations of the processing unit 130 (operations of the channel estimation unit 131, the eigenvalue decomposition processing unit 133, the transmission layer selection unit 135, the BF weight generation unit 137 and the BF weight multiplication unit 139).

<3.2. Configuration of Terminal Apparatus>

Figure 6:
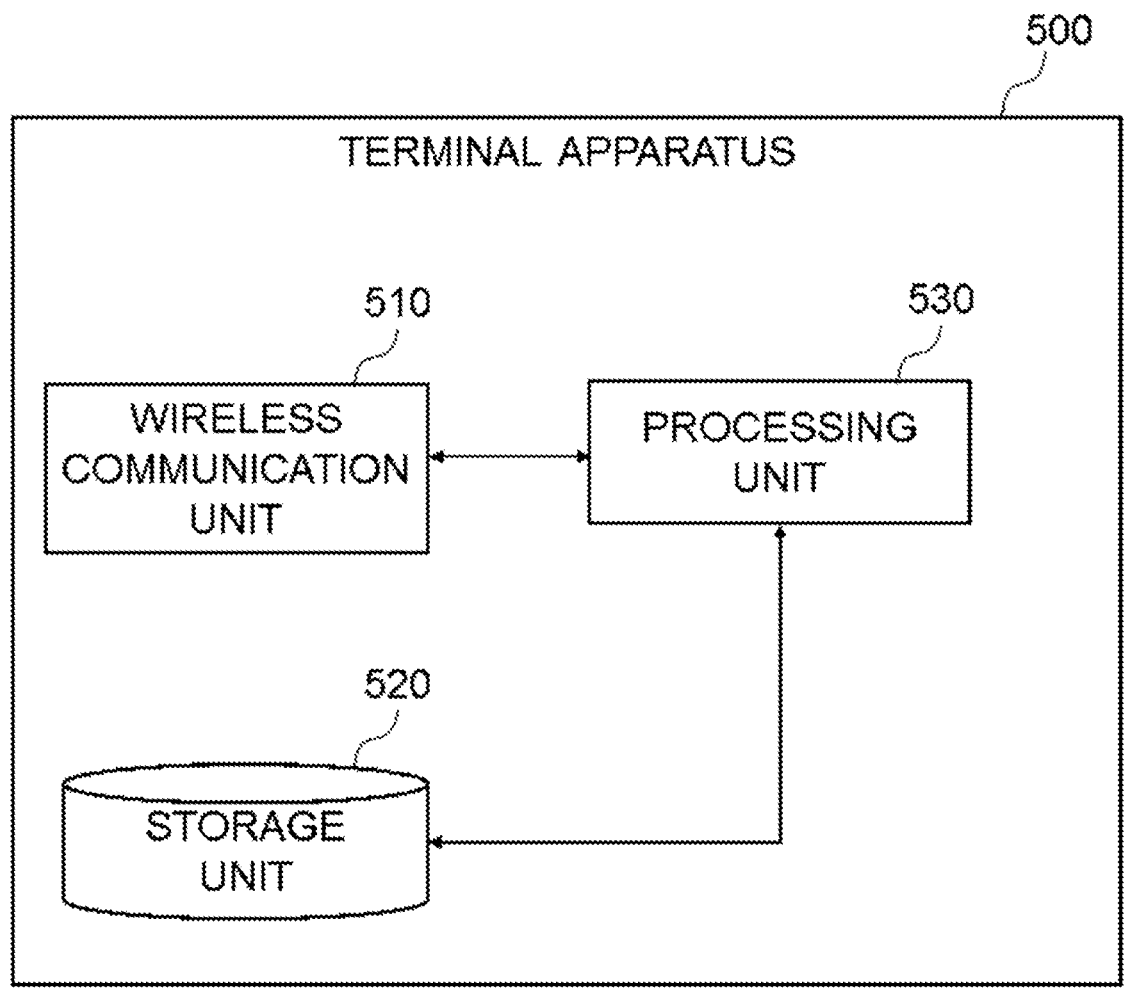
FIG. 6 is a block diagram illustrating an example of a configuration of a terminal apparatus according to the first example embodiment.

Next, an example of a configuration of the terminal apparatus 500 according to the first example embodiment is described with reference to FIG. 6. FIG. 6 is a block diagram illustrating an example of a schematic configuration of the terminal apparatus 500 according to the first example embodiment. Referring to FIG. 6, the terminal apparatus 500 includes a wireless communication unit 510, a storage unit 520 and a processing unit 530.

(1) Wireless Communication Unit 510

The wireless communication unit 510 is configured to wirelessly transmit and receive signals. For example, the wireless communication unit 510 receives a signal from the base station 100 and transmits a signal to the base station 100.

(2) Storage Unit 520

The storage unit 520 is configured to store programs and parameters for operation of the terminal apparatus 500 as well as various data temporarily or permanently.

(3) Processing Unit 530

The processing unit 530 is configured to provide various functions of the terminal apparatus 500. For example, the processing unit 530 processes signals received by the wireless communication unit 510 and displays an image on a monitor of the terminal apparatus 500.

(4) Implementation Examples

The wireless communication unit 510 may be implemented with an antenna, a high frequency (RF)) circuit and the like. The storage unit 520 may be implemented with a memory (for example, non-volatile memory and/or volatile memory), hard disc and/or the like. The processing unit 530 may be implemented with a Base Band (BB) processor, another processor and/or the like. The above memory (the storage unit 520) may be included in such a processor (a chip).

The terminal apparatus 500 may include a memory that stores programs and one or more processors that are capable of executing the programs and the one or more processors may execute the operations of the processing unit 530. The programs may be programs for causing a processor to execute the operations of the processing unit 530.

<3.3. Technical Features>

Next, the technical features of the first example embodiment are described.

The channel estimation unit 131 is configured to perform channel estimation on uplink of each terminal apparatus 500 using predefined reference signals. The channel estimation results obtained at the channel estimation unit 131 are output to the eigenvalue decomposition processing unit 133.

The eigenvalue decomposition processing unit 133 is configured to perform eigenvalue decomposition using the channel estimate input for each terminal apparatus 500 to calculate eigenvalues and eigenvectors. An eigenvalue and an eigenvector calculated for each terminal apparatus 500 are output to the transmission layer selection unit 135.

The transmission layer selection unit 135 is configured to use the eigenvalue and eigenvector input for each terminal apparatus 500 to determine a transmission layer of each terminal apparatus 500. The determined transmission layer information for each terminal apparatus 500 is output to the BF weight generation unit 137 along with the eigenvalue and eigenvector information. Details of the transmission layer selection unit 135 will be described later.

The BF weight generation unit 137 is configured to generate BF weights on the basis of the input transmission layer information and the eigenvalue and eigenvector information. The BF weight information generated at the BF weight generation unit 137 is output to the BF weight multiplication unit 139.

The BF weight multiplication unit 139 is configured to multiply the input BF weights information with transmission data to generate transmission signals and output the transmission signals.

Figure 7:
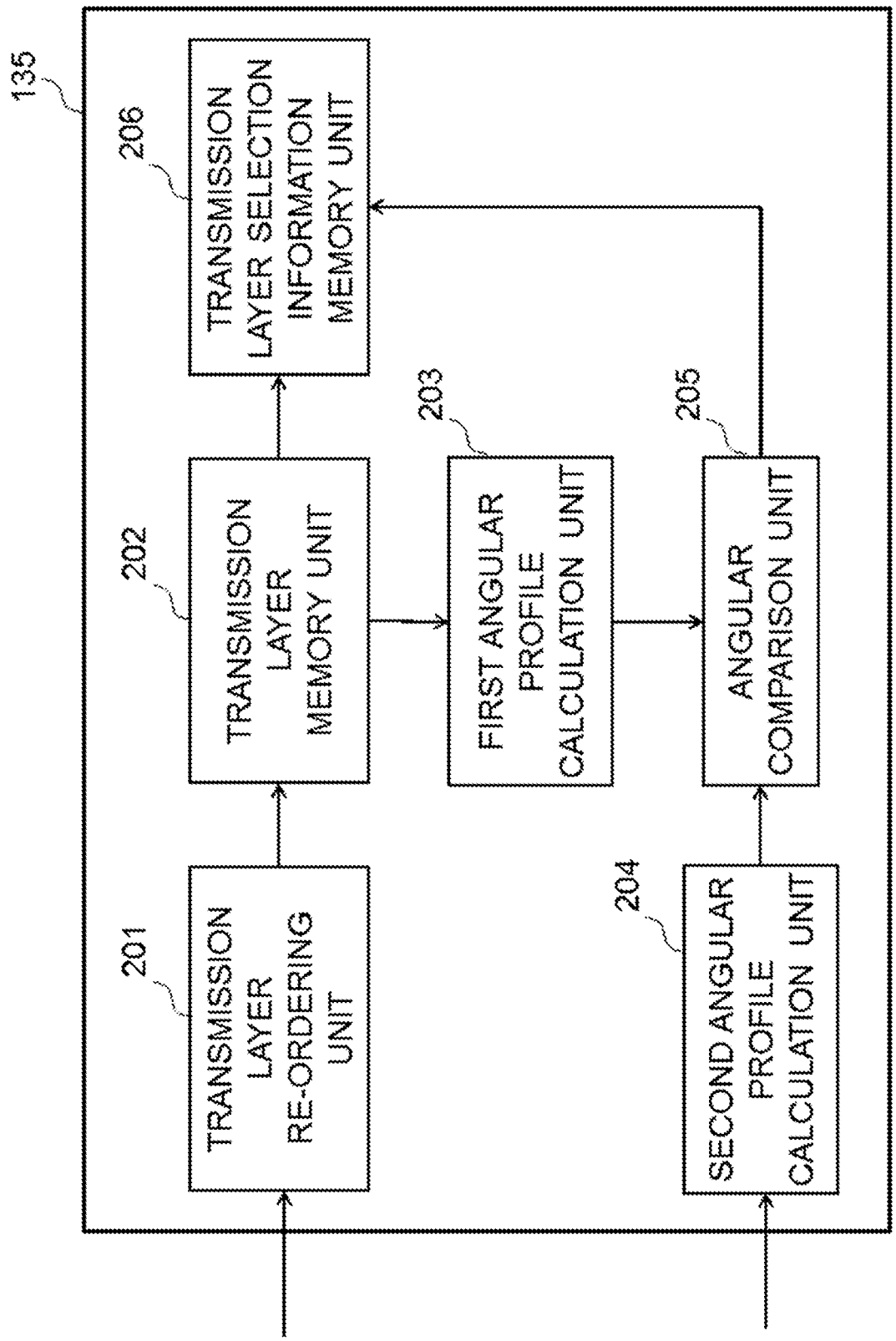
FIG. 7 is a block diagram illustrating a detailed configuration of a transmission layer selection unit included in a base station according to a first example embodiment.

FIG. 7 is a block diagram illustrating a detailed configuration of the transmission layer selection unit 135. The transmission layer selection unit 135 has a transmission layer re-ordering unit 201, a transmission layer memory unit 202, a first angular profile calculation unit 203, a second angular profile calculation unit 204, an angular comparison unit 205 and a transmission layer selection information memory unit 206.

The transmission layer re-ordering unit 201 is configured to set priorities to the plurality of terminal apparatuses 500 in descending order of the eigenvalue levels (amplitude values or power values) on the basis of the input eigenvalue information, re-order the transmission layer information in accordance with the priorities and output the re-ordered information along with the eigenvalue and eigenvector information to the transmission layer memory unit 202.

The transmission layer memory unit 202 is configured to store the input re-ordered transmission layer information and the eigenvalue and eigenvector information and output the information to the first angular profile calculation unit 203 and the transmission layer selection information memory unit 206.

The first angular profile calculation unit 203 is configured to calculate angular profiles of the terminal apparatuses 500 having the second or subsequent priorities on the basis of the re-ordered transmission layer information and the eigenvalue and eigenvector information and output the calculated angular profile information to the angular comparison unit 205.

The second angular profile calculation unit 204 is configured to calculate an angular profile between each terminal apparatus 500 and the base station 100 using channel estimates input for each terminal station. The angular profile calculated at the second angular profile calculation unit 204 is output to the angular comparison unit 205.

The angular comparison unit 205 is configured to compare an angular profile information A input from the first angular profile calculation unit 203 with angular profile information B of higher-priority terminal apparatus(es) 500 input from the second angular profile calculation unit 204 to determine whether or not the path angle with the largest eigenvalue level included in the angular profile information A coincides with or falls within a certain angular range around the angles of multiple paths included in the angular profile information B.

Herein, among the multiple paths included in the angular profile information B, for example, only the paths having peak values, only a predefined number of paths having the largest eigenvalue levels (amplitude values or power values), or only paths of which eigenvalue levels are equal to or larger than a predefined threshold may be derived for taking into consideration. This reduces the number of compared paths in comparison of path angles to a moderate extent, allowing to shorten processing time at the angular comparison unit 205.

The angular comparison unit 205 is configured to perform a path exclusion process, in which, if an angle of a path in the angular profile information A coincides with or falls within a certain angular range around any of angles of multiple paths included in the angular profile information B, such a path is excluded from transmission paths (or transmission layers) of a terminal apparatus 500 corresponding to the angular profile information A, determine a remaining path that has not been excluded to be a transmission layer, and output the determination result (determined transmission layer information) to the transmission layer selection information memory unit 206.

Meanwhile, if angles of paths in the angular profile information A do not coincide with or fall within a certain angular range around any of angles of multiple paths included in the angular profile information B, the angular comparison unit 205 may determine all of such paths to be transmission layers and output the determination result to the transmission layer selection information memory unit 206.

Herein, when determining whether or not an angle of a path in the angular profile information A coincides with or falls within a certain angular range around any of angles of multiple paths included in the angular profile information B, paths that have been excluded from transmission layers in preceding path exclusion process (if any) may be omitted from the compared paths. This can leave room for a path of which angle would not cause interference to be determined as a transmission layer.

Note that the determination process at the angular comparison unit 205 may be carried out for angular profile information of all the terminal apparatuses 500. This makes it possible to prevent occurrence of an interference among terminal apparatuses comprehensively over the plurality of terminal apparatuses. Alternatively, the determination process at the angular comparison unit 205 may be carried out for a predefined number of terminals in order of priority (in other words, until the maximum number of transmission layers is reached).

The transmission layer selection information memory unit 206 is configured to determine transmission layer selection information to be output on the basis of the transmission layer information input from the transmission layer memory unit 202 and the determined transmission layer information input from the angular comparison unit 205 and output the transmission layer selection information indicating the determined transmission layer and corresponding eigenvalue and eigenvector information of that transmission layer.

Figure 8:
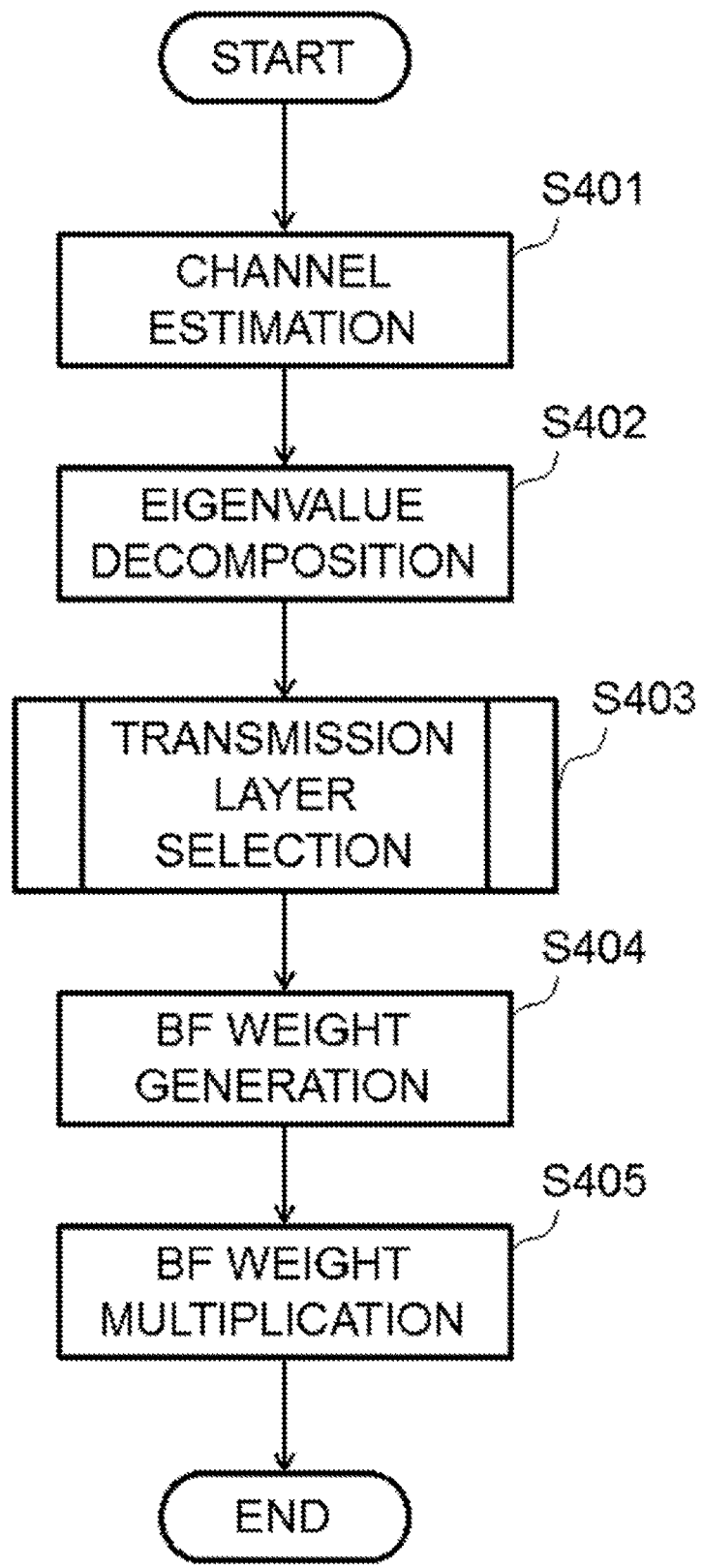
FIG. 8 is a flow chart illustrating operations to generate a transmission signal by the base station according to the first example embodiment.

Next, an operation to generate a transmission signal is described using the flowchart shown in FIG. 8.

First, a channel estimate is derived for each terminal apparatus (S401). Next, an eigenvalue decomposition is performed using the derived channel estimate to calculate an eigenvalue and an eigenvector for each terminal apparatus (S402). Then, a transmission layer is selected using the calculation result of eigenvalues and eigenvectors of all the terminal apparatuses (S403).

Figure 9:
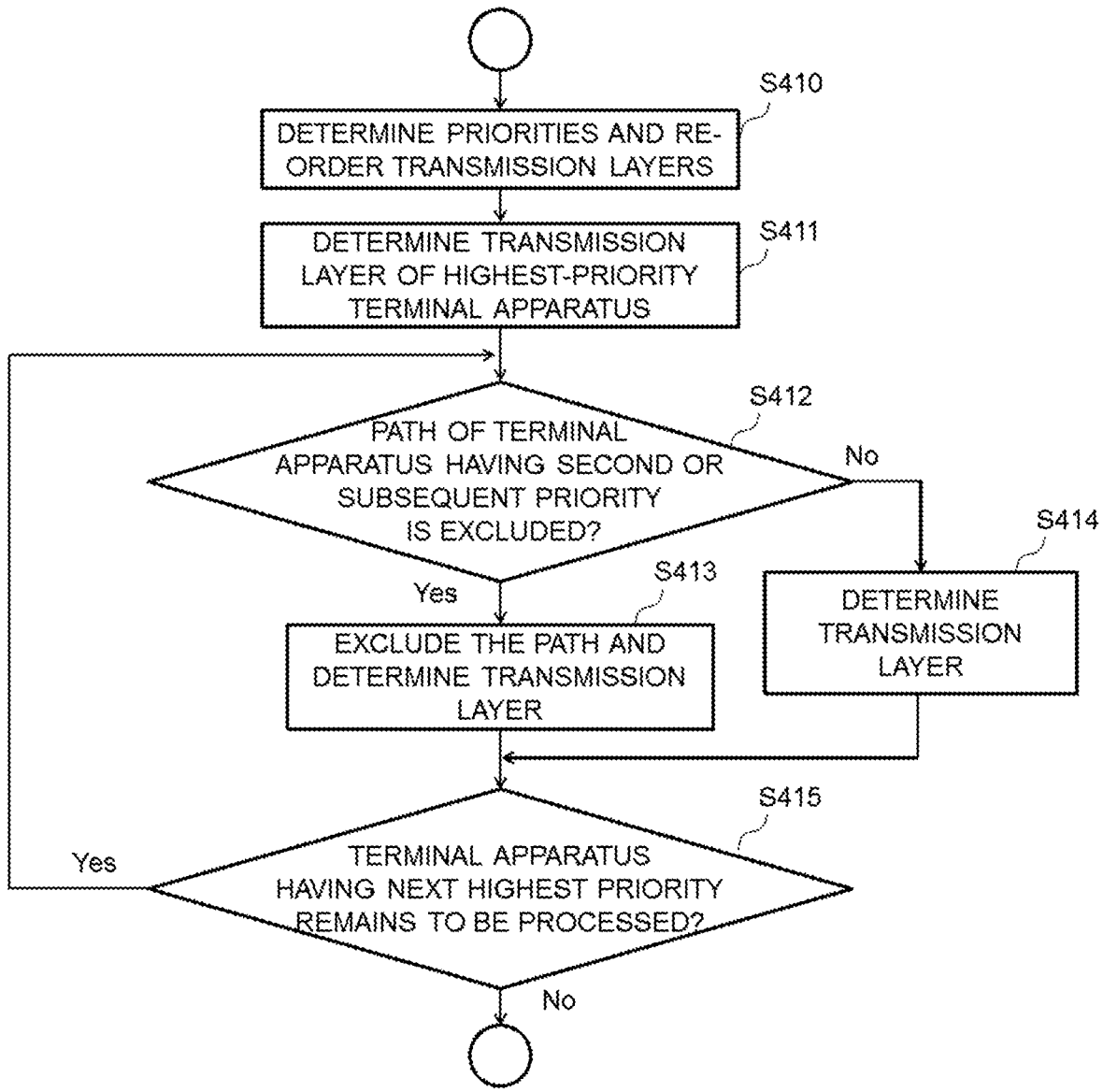
FIG. 9 is a flow chart illustrating operations in selecting a transmission layer by the base station according to the first example embodiment.

An operation of transmission layer selection is described using the flowchart shown in FIG. 9. For each terminal apparatus, a path having the largest eigenvalue level (hereinafter, referred to as the largest path) is derived using the channel estimate. The terminal apparatuses are assigned priorities in descending order of the eigenvalue levels and, then, transmission layers of the terminal apparatuses are re-ordered in order of priority (S410). Next, the largest path with the largest eigenvalue level, in other words, the largest path of the terminal apparatus having the highest priority is determined as its transmission layer (S420).

Next, an angular profile is calculated for the terminal apparatus of which largest path has the second largest eigenvalue level (having the second highest priority) and compared with the multiple paths indicated in the angular profile calculated from the channel estimate of the terminal apparatus (having the highest priority) of which largest path has the largest eigenvalue level (S412). If the angle of the largest path of the terminal apparatus with the second highest priority coincides with or falls within a certain angular range around any of angles of multiple paths included in the angular profile of the terminal apparatus with the highest priority (Yes from S412), the largest path with the second largest level is excluded from transmission layers of the terminal apparatus with the second highest priority and remaining multiple paths are determined to be transmission layers of the terminal apparatus with the second highest priority (S413). On the other hand, if the angle of the largest path of the terminal apparatus with the second highest priority does not coincide with or fall within a certain angular range around any of angles of multiple paths included in the angular profile of the terminal apparatus with the highest priority (No from S412), the largest path is determined to be the transmission layer of that terminal apparatus (S414). After the process step of S413 or S414, it is determined whether to proceed to terminal apparatuses with subsequent highest priorities (S415). If there remains any terminal apparatus to be processed (Yes from S415), the process step S412 is performed again where, for a terminal apparatus with the third or subsequent priority, the angular profiles of the terminal apparatuses with priorities higher than that terminal apparatus are taken as comparable ones. For example, the angle of the largest path of the terminal apparatus with the third highest priority is compared with the angular profiles of the terminal apparatuses with the highest and second highest priorities to determine whether it coincides with or falls within a certain angular range around any of angles of multiple paths included in those angular profiles. In a case where the number of terminal apparatuses is n (n is an integer which is equal to or larger than three), the above determination may be done until the process reaches the terminal apparatus with the n-th highest priority thereby completing determination on all of the terminal apparatuses with the third highest or subsequent priorities. Alternatively, the above determination may be done until the process reaches the terminal apparatus with the (n–k)-th highest priority (k is an integer which satisfies $1 \leq k \leq n-2$) thereby performing determination on terminal apparatuses with priorities ranked among a predefined number of highest priorities in a case where the number of terminal apparatuses is equal to or larger than three.

If there remains no terminal apparatus to be processed (No from S415), the transmission layer selection process ends.

Referring back to the flowchart of FIG. 8, BF weights are generated from the transmission layer selection result (S404) and a transmission signal is generated by multiplying the generated BF weights with transmission data (S405).

The present disclosure provides the following advantageous effects:

According to the above solution, an occurrence of interference among terminal stations, which would be caused when a downlink signal is transmitted over a beam formed toward a terminal station by beam-forming reaches another terminal station, can be avoided, which allows for improvement in throughput characteristics of such another terminal station and the entire system.

4. Second Example Embodiment

Figure 10:
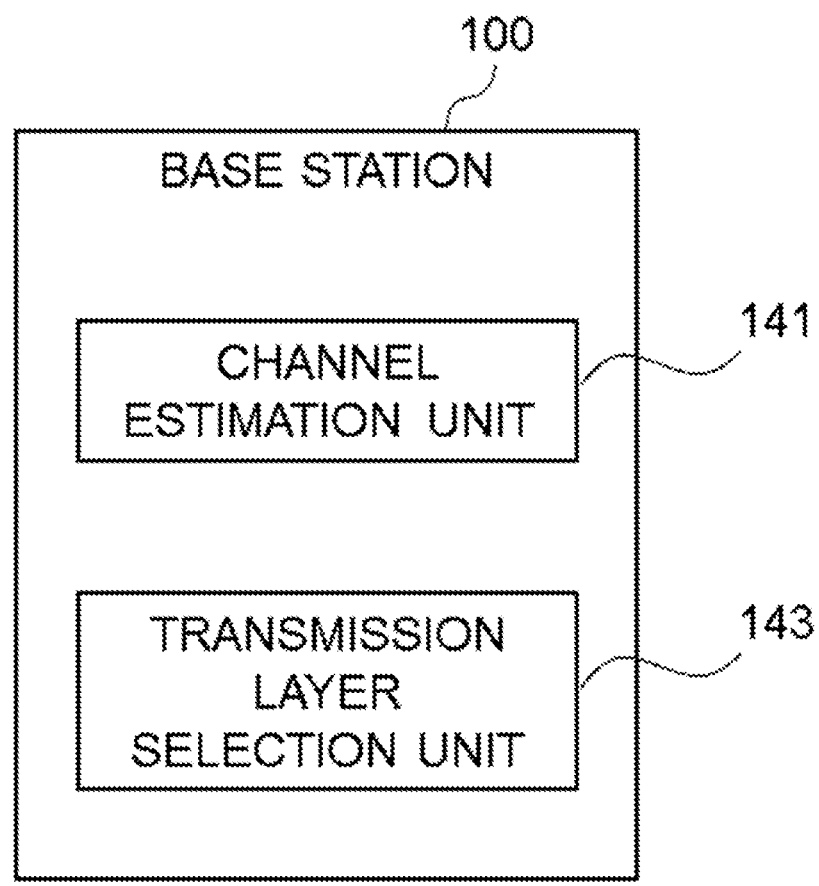
FIG. 10 is a block diagram illustrating an example of a configuration of a base station according to a second example embodiment.

Next, a second example embodiment of the present disclosure will be described with reference to FIG. 10. The foregoing first example embodiment is a concrete example embodiment whereas the second example embodiment is a more generalized example embodiment.

<4.1. Configuration of Base Station>

An example of a configuration of the base station 100 according to the second example embodiment is described with reference to FIG. 10. FIG. 10 is a block diagram illustrating an example of a schematic configuration of the base station 100 according to the second example embodiment. Referring to FIG. 10, the base station 100 includes a channel estimation unit 141 and a transmission layer selection unit 143.

Specific actions of the channel estimation unit 141 and the transmission layer selection unit 143 will be described later.

The channel estimation unit 141 and the transmission layer selection unit 143 may be implemented with a Base Band (BB) processor, another processor and/or the like. The channel estimation unit 141 and the transmission layer selection unit 143 may be implemented with the same processor or with respective different processors.

The base station 100 may include a memory that stores programs and one or more processors that are capable of executing the programs and the one or more processors may execute the operations of the channel estimation unit 141 and the transmission layer selection unit 143. The programs may be programs for causing the one or more processors to execute the operations of the channel estimation unit 141 and the transmission layer selection unit 143.

Note that the configuration of each terminal apparatus may be similar to that of the first example embodiment and the descriptions thereof are omitted.

<4.2. Technical Features>

Next, technical features of the second example embodiment are described. The foregoing first example embodiment is a concrete example embodiment whereas the second example embodiment is a more generalized example embodiment.

The base station 100 (the channel estimation unit 141) performs channel estimations respectively on the terminal apparatuses 500-1, 500-2, . . . , 500-*n* (n is an integer that is equal to or larger than two). Then, the base station 100 (the transmission layer selection unit 143) determines a transmission layer of a target terminal apparatus by comparing angular profiles respectively obtained on the basis of channel estimates regarding the target terminal apparatus and at least one comparable terminal apparatus out of the plurality of terminal apparatuses calculated by the channel estimation unit 141 and performing the path exclusion process to exclude, from transmission layers of the target terminal apparatus, a path that coincides with or falls within a certain angular range around any path angle included in angular profile(s) of at least one comparable terminal apparatus.

As described above, configuring the base station 100 to select a transmission layer on the basis of angular profile of each terminal apparatus makes it possible to avoid a path for a lower-priority terminal apparatus from causing an interference on paths of higher-priority terminal apparatuses. In other words, it will be possible to prevent occurrence of an interference among terminal apparatuses when a base station forms a beam toward a terminal apparatus by beam-forming to transmit a downlink signal, and to improve reception quality at a terminal apparatus.

5. Other Modes

Though example embodiments of the present disclosure have been described herein, the present disclosure is not limited to these example embodiments. It will be understood by those of ordinary skill in the art that these example embodiments are illustrative only and that various alterations can be done without departing from the scope and spirit of the present disclosure.

For example, the channel estimates may be calculated by the base station 100 receiving signals transmitted from terminal apparatuses or may be fed-back from terminal apparatuses which calculate the channel estimates to the base station 100.

The determination by the angular comparison unit 205 on whether or not a path angle in an angular profile of a target terminal apparatus coincides with (or falls within a predefined angular range around) any path angle in angular profile(s) of higher-priority terminal apparatus(es) may be done taking at least one of the following additional determination criteria into consideration:
(1) a path in the angular profile of the target terminal apparatus is excluded from transmission layers of the target terminal apparatus if its eigenvalue level is equal to or larger than a threshold value Th; and
(2) a path in the angular profile of the target terminal apparatus is excluded from transmission layers if its eigenvalue level is equal to or larger than <an eigenvalue level of a path of higher-priority terminal apparatus(es) minus X>, where X is a predefined configuration value.

Though priorities are determined for respective terminal apparatuses depending on relative difference in eigenvalues levels at the transmission layer re-ordering unit 201 in the above-described example embodiments, the priorities may alternatively be determined according to at least one of the following criteria:
(1) ascending/descending order of terminal apparatus number (ID);
(2) descending/ascending order of UL (or DL) reception quality;
(3) descending/ascending order of amount of pending (buffered) transmission data in DL (or UL);
(4) ascending/descending order of moving speed of terminal apparatus;
(5) descending/ascending order of the number of multiple paths between terminal apparatus and base station;
(6) descending/ascending order of priority in radio resource assignment; and
(7) any other criterion which allows to determine an order of terminal apparatuses.

The eigenvalues and eigenvectors calculated from channel estimates may be singular values and singular vectors.

The determination by the angular comparison unit 205 on whether or not a path angle in an angular profile of a target terminal apparatus coincides with (or falls within a predefined angular range around) any path angle in angular profile(s) of higher-priority terminal apparatus(es) may be done using horizontal angle or vertical angle (or azimuth angle or elevation angle) or any combination of those dimensions.

The angular range used in the determination on whether or not a path angle in an angular profile of a target terminal apparatus coincides with (or falls within the predefined angular range around) any path angle in angular profile(s) of higher-priority terminal apparatus(es) may be determined depending on the corresponding eigenvalue level. Specifically, the angular range may be wider when the eigenvalue level of a path in question is larger and the angular range may be narrower when the eigenvalue level of the path in question is smaller.

The example embodiments, for example, are applicable not only to the case of transmitting downlink signals but also to the case of receiving uplink signals.

The example embodiments are applicable not only to the above-described TDD system but also to the case where Frequency Division Duplex (FDD) is assumed as far as angular profiles are available.

In the determination performed by the angular comparison unit 205, even when a path in the angular profile of the target terminal apparatus collides with a path in an angular profile of a higher-priority terminal apparatus, such a path may be determined as transmission path if the level of the path belongs to a low range (an angular range which does not exceed a predefined level of paths).

For example, the steps in processes described in the present specification may not necessarily be performed chronologically in the order illustrated in the flowcharts. For example, steps in a process may be performed in a different order than the order illustrated in a flowchart or may be performed in parallel. Some of steps in a process may be removed or further steps may be added to a process.

Moreover, an apparatus (for example, one or more apparatuses (or units) out of a plurality of apparatuses (or units) comprised in a base station) or a module (for example, a module for one of the plurality of apparatuses (or units)) including constituent elements of the base station described in the present specification may be provided. An apparatus including constituent elements of the terminal apparatus described in the present specification (for example, a module for the terminal apparatus) may be provided. In addition, methods including processes of such constituent elements may be provided, and programs for causing processors to execute processes of such constituent elements may be provided. Furthermore, computer-readable non-transitory recording media (non-transitory computer readable medium) having recorded thereon such programs may be provided. It is apparent that such apparatuses, methods, programs and computer-readable non-transitory recording media are also included in the present disclosure.

Some or all of the above-described example embodiments can be described as in the following Supplementary Notes, but are not limited to the following.

(Supplementary Note 1)

A base station comprising:
a channel estimation unit configured to perform channel estimations respectively on a plurality of terminal apparatuses; and
a transmission layer selection unit configured to determine a transmission layer of a target terminal apparatus by comparing angular profiles respectively obtained on the basis of channel estimates on the target terminal apparatus and at least one comparable terminal apparatus out of the plurality of terminal apparatuses and performing a path exclusion process to exclude, from transmission layers of the target terminal apparatus, a path that falls within a certain angular range around a path angle indicated by an angular profile of the at least one comparable terminal apparatus.

(Supplementary Note 2)

The base station according to Supplementary Note 1, wherein the transmission layer selection unit is configured to determine a path obtained on the basis of a channel estimate calculated for a terminal apparatus having the highest predetermined priority as a transmission layer of that terminal apparatus.

(Supplementary Note 3)

The base station according to Supplementary Note 2, wherein the transmission layer selection unit is configured to determine a transmission layer for a terminal apparatus having the second or subsequent priority by performing the path exclusion process.

(Supplementary Note 4)

The base station according to Supplementary Note 2 or 3, further comprising an eigenvalue decomposition processing unit configured to perform eigenvalue decomposition using a channel estimate obtained for each terminal apparatus, wherein the transmission layer selection unit is configured to determine priorities of the plurality of terminal apparatuses in descending order of an eigenvalue level of each terminal apparatus.

(Supplementary Note 5)

The base station according to any one of Supplementary Notes 2 to 4, wherein the transmission layer selection unit is configured to take a path having a peak as the comparable one in the path exclusion process, the path being out of multiple paths of a terminal apparatus having a higher priority.

(Supplementary Note 6)

The base station according to any one of Supplementary Notes 2 to 4, wherein the transmission layer selection unit is configured to take a path of which eigenvalue level is ranked among a predetermined number of largest levels as the comparable one in the path exclusion process, the path being out of multiple paths of a terminal apparatus having a higher priority.

(Supplementary Note 7)

The base station according to any one of Supplementary Notes 2 to 4, wherein the transmission layer selection unit is configured to take a path of which eigenvalue level is equal to or larger than a predefined threshold as the comparable one in the path exclusion process, the path being out of multiple paths of a terminal apparatus having a higher priority.

(Supplementary Note 8)

The base station according to any one of Supplementary Notes 2 to 7, wherein the transmission layer selection unit is configured not to take a path that has been excluded in the path exclusion process as comparable one in the path exclusion process, the path being out of multiple paths of a terminal apparatus having a higher priority.

(Supplementary Note 9)

The base station according to any one of Supplementary Notes 2 to 8, wherein the transmission layer selection unit is configured to perform the path exclusion process for a terminal apparatus having the second or subsequent priority out of the plurality of terminal apparatuses.

(Supplementary Note 10)

The base station according to any one of Supplementary Notes 2 to 8, wherein the transmission layer selection unit is configured to perform the path exclusion process for terminal apparatuses having a priority among a predetermined number of highest priorities.

(Supplementary Note 11)

A method comprising:

performing channel estimations respectively on a plurality of terminal apparatuses; and determining a transmission layer of a target terminal apparatus by comparing angular profiles respectively obtained on the basis of channel estimates on the target terminal apparatus and at least one comparable terminal apparatus out of the plurality of terminal apparatuses and performing path exclusion process to exclude, from transmission layers of the target terminal apparatus, a path that falls within a certain angular range around a path angle indicated by an angular profile of the at least one comparable terminal apparatus.

(Supplementary Note 12)

A program for causing a processor to execute:

performing channel estimations respectively on a plurality of terminal apparatuses; and determining a transmission layer of a target terminal apparatus by comparing angular profiles respectively obtained on the basis of channel estimates on the target terminal apparatus and at least one comparable terminal apparatus out of the plurality of terminal apparatuses and performing path exclusion process to exclude, from transmission layers of the target terminal apparatus, a path that falls within a certain angular range around a path angle indicated by an angular profile of the at least one comparable terminal apparatus.

(Supplementary Note 13)

A computer-readable non-transitory recording medium having recorded thereon a program for causing a processor to execute:

performing channel estimations respectively on a plurality of terminal apparatuses; and determining a transmission layer of a target terminal apparatus by comparing angular profiles respectively obtained on the basis of channel estimates on the target terminal apparatus and at least one comparable terminal apparatus out of the plurality of terminal apparatuses and performing path exclusion process to exclude, from transmission layers of the target terminal apparatus, a path that falls within a certain angular range around a path angle indicated by an angular profile of the at least one comparable terminal apparatus.

This application claims priority based on Japanese Patent Application No. 2018-039371 filed on Mar. 6, 2018, the entire disclosure of which is incorporated herein.

In a mobile communication system, it will be possible to prevent occurrence of an interference among terminal apparatuses when a base station forms a beam toward a terminal apparatus by beam-forming to transmit a downlink signal.

What is claimed is:

1. A base station comprising:

a memory storing instructions; and one or more processors configured to execute the instructions to:

perform channel estimations respectively on a plurality of terminal apparatuses; and determine a transmission layer of a target terminal apparatus by comparing angular profiles respectively obtained on the basis of channel estimates on the target terminal apparatus and at least one comparable terminal apparatus out of the plurality of terminal apparatuses and performing a path exclusion process to exclude, from transmission layers of the target terminal apparatus, a path that falls within a certain angular range around a path angle indicated by an angular profile of the at least one comparable terminal apparatus.

2. The base station according to claim 1, wherein the one or more processors are configured to execute the instructions to determine a path obtained on the basis of a channel estimate calculated for a terminal apparatus having the highest predetermined priority as a transmission layer of that terminal apparatus.

3. The base station according to claim 2, wherein the one or more processors are configured to execute the instructions to determine a transmission layer for a terminal apparatus having the second or subsequent priority by performing the path exclusion process.

4. The base station according to claim 2, wherein the one or more processors are configured to execute the instructions to:
perform eigenvalue decomposition using a channel estimate obtained for each terminal apparatus; and
determine priorities of the plurality of terminal apparatuses in descending order of an eigenvalue level of each terminal apparatus.

5. The base station according to claim 2, wherein the one or more processors are configured to execute the instructions to take a path having a peak as the comparable one in the path exclusion process, the path being out of multiple paths of a terminal apparatus having a higher priority.

6. The base station according to claim 2, wherein the one or more processors are configured to execute the instructions to take a path of which eigenvalue level is ranked among a predetermined number of largest levels as the comparable one in the path exclusion process, the path being out of multiple paths of a terminal apparatus having a higher priority.

7. The base station according to claim 2, wherein the one or more processors are configured to execute the instructions to take a path of which eigenvalue level is equal to or larger than a predefined threshold as the comparable one in the path exclusion process, the path being out of multiple paths of a terminal apparatus having a higher priority.

8. The base station according to claim 2, wherein the one or more processors are configured to execute the instructions not to take a path that has been excluded in the path exclusion process as comparable one in the path exclusion process, the path being out of multiple paths of a terminal apparatus having a higher priority.

9. The base station according to claim 2, wherein the one or more processors are configured to execute the instructions to perform the path exclusion process for a terminal apparatus having the second or subsequent priority out of the plurality of terminal apparatuses.

10. The base station according to claim 2, wherein the one or more processors are configured to execute the instructions to perform the path exclusion process for terminal apparatuses having a priority among a predetermined number of highest priorities.

11. A method comprising:
performing channel estimations respectively on a plurality of terminal apparatuses; and
determining a transmission layer of a target terminal apparatus by comparing angular profiles respectively obtained on the basis of channel estimates on the target terminal apparatus and at least one comparable terminal apparatus out of the plurality of terminal apparatuses and performing path exclusion process to exclude, from transmission layers of the target terminal apparatus, a path that falls within a certain angular range around a path angle indicated by an angular profile of the at least one comparable terminal apparatus.

* * * * *